United States Patent Office 3,305,041
Patented Feb. 21, 1967

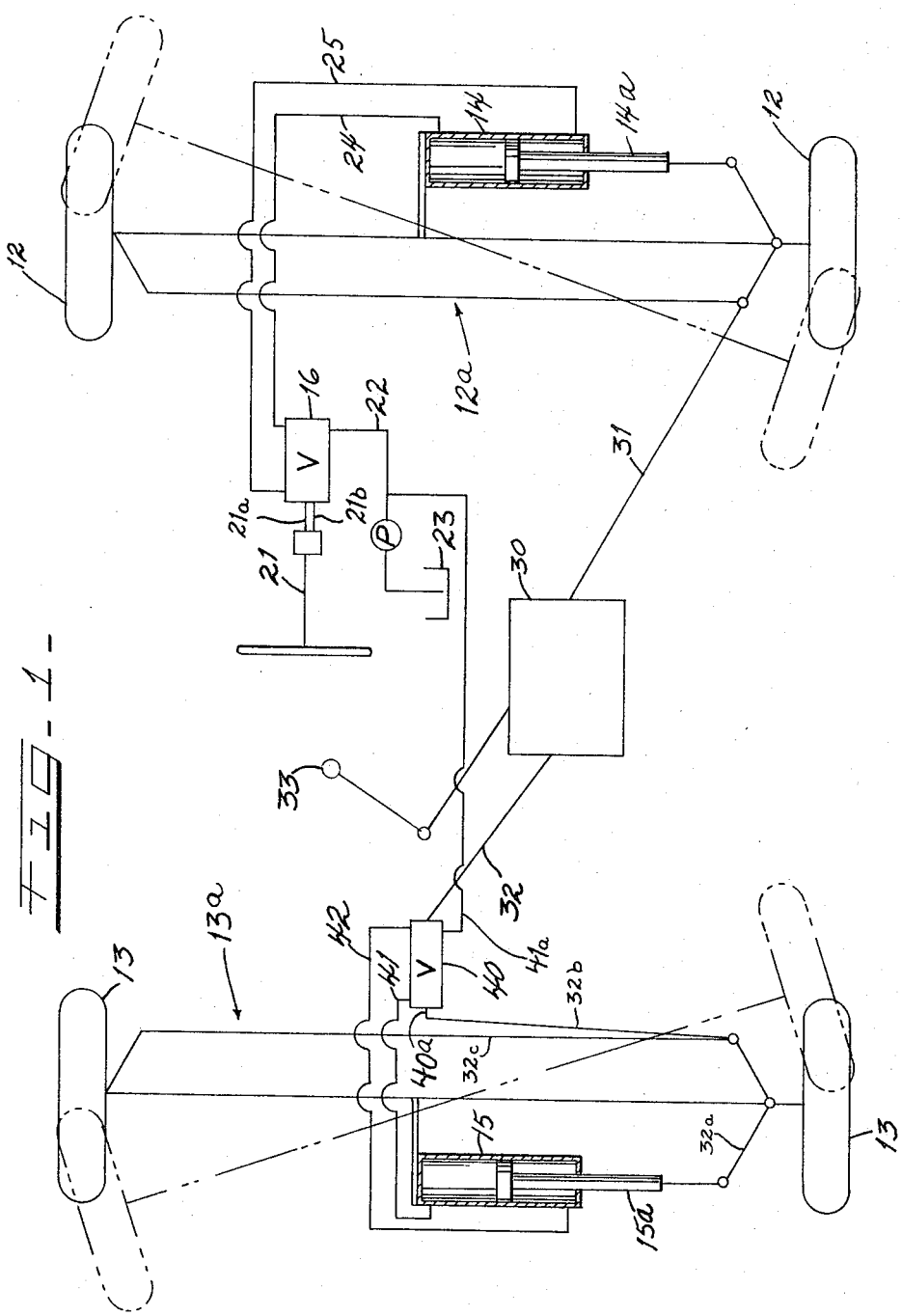

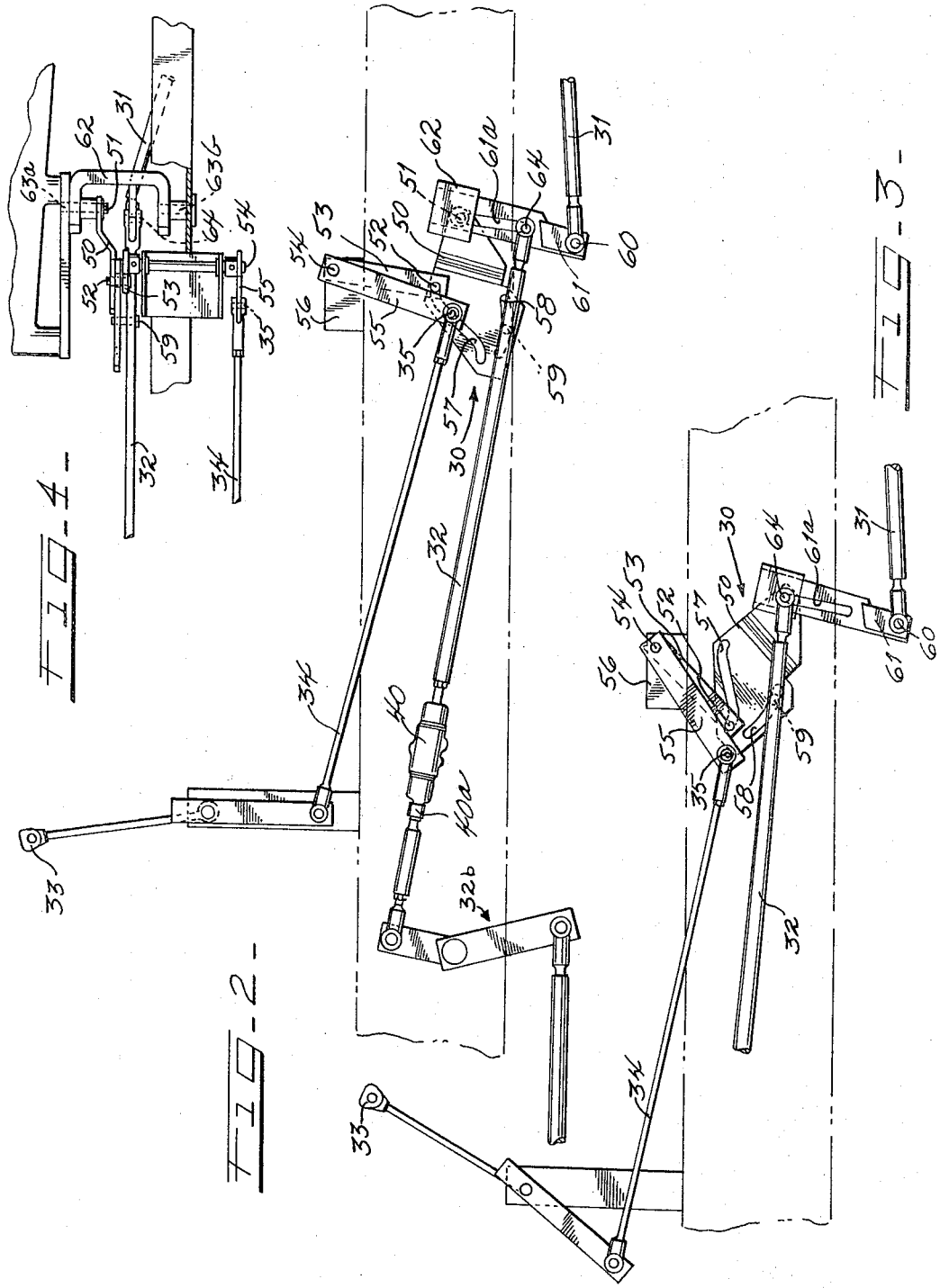

3,305,041
FOUR WHEEL STEERING SYSTEM
Harold J. Schramm, Westmont, Ill., assignor to International Harvester Company, Chicago, Ill., a corporation of New Jersey
Filed July 1, 1965, Ser. No. 468,680
10 Claims. (Cl. 180—79.2)

This invention relates to steering systems for vehicles having a plurality of wheels, front and rear, and more particularly tractors having front and rear steerable pairs of wheels generally of the type illustrated in Beyerstedt Patent No. 3,075,784 of January 29, 1963.

It is an object of the invention to provide a steering system for a tractor equipped with a hydraulic power system, having a plurality of pairs of front and rear wheels, and in which hydraulic cylinders operatively associated with the hydraulic power system are selectively utilized to steer the front and rear wheels under operator control.

It is a further object of the invention to provide such a steering system in which the front wheels are steerable as a unit independently of the rear wheels and the rear wheels are steerable as a unit correspondingly in an inverted pattern, at the option of the operator, to provide an over-all arcuate pattern of travel for the tractor.

It is an additional object of the invention to provide in such a system a self-locking control of the steering mechanism.

Other objects and features of this invention will be apparent from the description which follows when considered with the accompanying drawings.

In the drawings:

FIG. 1 is a schematic drawing illustrative of an embodiment of the invention;

FIG. 2 is a detail schematic drawing of a portion of the invention illustrated in FIG. 1 in side elevation;

FIG. 3 is a detail drawing of a portion of the invention illustrated in FIG. 2 in another position of operation;

FIG. 4 is a plan view of the portion of the invention shown in FIG. 2.

Referring to the drawings and particularly to FIG. 1, the tractor 11 comprises front and rear wheel assemblies 12a and 13a, respectively, including front and rear pairs of wheels 12, 13, separately steerable by hydraulic cylinders 14, 15, which are operatively associated, in a manner to be more fully described, with a conventional hydraulic power system (not shown) carried by the tractor 11.

Hydraulic cylinder 14 is actuated to steer front wheels 12 under operator control by conventional means including a valve 16 which may be of the type of Moyer Patent No. 3,059,717 dated October 23, 1962, or the commercially well-known Ross valve, manufactured by Ross Gear and Tool Company, Inc. of Lafayette, Indiana.

Valve 16 is operatively connected in well-known manner with the steering column 21 of the tractor through lines 21a, 21b and with the hydraulic power system of the tractor through the line 22 leading to the reservoir 23, and with cylinder 14 through the lines 24, 25. Pivotal movement of wheels 12 to the right, and to the left (FIG. 1), is accomplished in a familiar manner as piston rod 14a of cylinder 14 is projected and retracted respectively.

Mechanical linkage is provided for selectively obtaining inverted pivotal movement of the rear wheels 13 correspondingly with the steering of the front wheels 12. For this purpose a control assembly comprising a modified form of the well-known Stephenson link 30 (another form of which is described in Beyerstedt Patent No. 3,075,784 above-mentioned) is mechanically interlinked through linkages 31, 32 with front wheels 12 and rear wheels 13.

Link 30 is operable in well-known manner through lever 33 selectively to enable (1) the steering of front wheels 12 independently of and without pivotal movement of rear wheels 13, and (2) the steering of both sets of wheels correspondingly but in inverted pattern.

The steering of rear wheels 13 is modified by the interrelation of the mechanical linkage 32a, 32b, 32c and the hydraulic cylinder 15 through a valve arrangement including a steering sensing valve 40 of the commercial type manufactured by the Ross Gear and Tool Company, Inc., previously mentioned in connection with cylinder 14. The arrangement is such as to provide for the steering of the rear wheels in response to the operation of valve 40 mechanically, with and without power-assist by cylinder 15, through linkage 32b, 32c in well-known manner.

Valve 40 is operatively connected, to provide power-assist, with the hydraulic power system of the vehicle through the line 41a and hydraulic cylinder 15 through the lines 41, 42 and is arranged to operate in response to movement of the linkage 32 to cause cylinder 15 to operate through piston rod 15a to direct the rear pair of wheels 13 to the right, and to the left, in relation to the longitudinal median line or axis of the tractor. Such directional changes, due to the arrangement and operation of link 30, will conform in inverted pattern with the directional changes of the front pair of wheels 12. Reference to a hydraulic power system is not to be taken as limiting the invention to a single or unitary system, it being well-known that separate systems may be used for the several valve arrangements.

Link 30, differing from prior art forms of the Stephenson link, is arranged to perform, under operator control, through lever 33 and linkage 34, 32, two functions, namely, (1) to restrict the operation of the steering system of the tractor to the front wheels thereof; and (2) to transmit to the rear wheels, through valve 40, in inverse pattern correspondingly, directional changes affecting the front wheels. This is accomplished through a novel structural arrangement, which in addition to the functions stated, serves to provide for automatic locking of the linkage mechanism in selected positions of adjustment. It will be understood that appropriate mechanical expedients, including universal joints, are intended as may be desirable.

Link 30 comprises an assembly including a cam control plate or member 50 of generally rhombic configuration mounted for pivotal movement in a generally vertical plane about the axis of the pin 51 carried in convenient location by the tractor frame.

Associated with cam plate 50 in the assembly of link 30 is a pin 52 fixed on the generally vertical arm 53 adjacent its lower extremity, arm 53 being mounted adjacent its upper extremity for pivotal movement with and about the generally horizontal axis of a shaft 54 which is journalled in a bracket 56 carried by the tractor frame. An arm 55, which is also mounted adjacent its upper extremity on shaft 54 for pivotal movement therewith, is pivotally connected adjacent its lower extremity through pin 35 with linkage 34 and control lever 33.

Cam plate 50 is provided with cam tracks 57, 58 of predetermined configuration and arranged in predetermined spaced relation with one another and the parts associated with the cam plate. Cam track 57 is arranged to receive in camming relation therewith pin 52 of arm 53. Cam track 58 is arranged to receive in similar relation pin 59 carried by linkage 32.

Mechanical interconnection between link 30 and linkages 31, 32 is provided through pivot pin 60 carried by arm 61 of a reverse C bracket 62 which is mounted for relative pivotal movement about the generally horizontal longitudinal axis of the pins 63a, 63b, carried by the tractor frame, the former being an extension of the pin 51. A slot 61a extending generally longitudinally of arm 61 is arranged to receive in sliding relation a pin 64 carried by linkage 32 adjacent one end thereof. The configuration and arrangements are such that upon pivotal movement of the arm 61 about the stated axis, the pin 64 will move in the path of an arc about the axis of the pin 51, 63a.

It will be appreciated from the foregoing description that upon manipulation of lever 33 to the right, or to the left, as viewed in FIGS. 2, 3 arm 55 will pivot correspondingly, shaft 54 rotating and causing pivotal movement of arms 53, with pin 52 travelling in camming action within cam track 57, thereby causing pivotal movement of cam plate 50 about pin 51. Such pivotal movement of cam plate 50 causes corresponding displacement of cam track 58, pin 64 in slot 61a, linkage 32 and valve spool 40a.

Since it is an objective of the invention accurately to reflect the directional changes of the front wheels in the steering of the rear wheels in one phase of operation without operator intervention it is necessary truly to communicate shifts in the position of linkage 31 to linkage 32. This is accomplished when pin 64 is in lowermost position (FIG. 2) through the pivoting of arm 61 of bracket 62, which causes a corresponding arcuate movement of pin 64 and linkage 32. Obviously when pin 64 is in uppermost position, in which it is co-axial with pin 51, 63a, its arcuate path will have zero radius thereby inhibiting any longitudinal movement of linkage 32.

Accurate adjustment of link 30 and communication of shifts of linkage 31 to linkage 32 is enabled by correlating the configuration and position of cam tracks 57, 58 and slot 61a. To this end cam track 57 is designed to accommodate travel of pin 52 over a path corresponding to that of pin 64 in relation to slot 61a, the generally S curvature of cam track 57 reflecting the projected arc of pin 64 as cam plate 50 is pivoted about pin 51. Cam track 58 is curved correspondingly with the path of pin 64 as arm 61 is pivoted by shift of linkage 31.

The configuration and relative position of the cam tracks 57, 58 and slot 61a are such as to provide a predetermined movement, in slot 61a of pin 64 depending on the arrangement and length of links 31, 32 for selectively positioning pin 64 in slot 61a to establish and disestablish steering connection between the front and rear wheels.

When pin 64 is in its lowermost position in slot 61a (FIG. 2) operative connection is established for steering the rear wheels simultaneously with the front wheels; contrariwise, in uppermost position, when the rear wheels are directed straight ahead.

The locking feature of the invention is achieved through the correlation of the curvature and position of cam track 57 with pin 52, arm 53 and the axis of shaft 54. As will be observed in FIGS. 2 and 3 the end portions of cam track 57 and pin 52 are concentric, and when pin 52 is in either end position, any force longitudinally of linkage 32 is countered by thrust of pin 52 on the longitudinal axis of arm 53, shaft 54, bracket 56 and the tractor frame, thereby preventing rotation of arm 53 and shift of cam plate 50. Thus novel and efficient means are provided for stabilizing the steering of the tractor.

It will be apparent that the mechanism described, combining hydraulic power mechanism and mechanical linkages in the manner stated, in providing novel means for communicating directional changes in the front wheels of a tractor to the rear wheels thereof without operator intervention, accurately and with stability, countering undesired forces, and impulses, tending to deviate from an established path of travel marks a distinct improvement over prior art steering devices in simplicity, economy and efficiency of structure and operation.

It will be understood that changes in form and structure from the foregoing description may be made without departing from the spirit of the invention as set forth in the claims which follow.

I claim:

1. A steering system for a tractor equipped with a hydraulic power system and having front and rear wheel assemblies respectively including a pair of front wheels and a pair of rear wheels, said pairs of wheels being separately steerable in relation to the longitudinal axis of the tractor,
   (a) first and second hydraulic power means in operative communication with said hydraulic power system and arranged respectively to actuate said pairs of wheels in steering movement thereof,
   (b) valve means in operative communication with said hydraulic power system and said first hydraulic power means for actuating the same under operator control, to effect directional changes in the path of travel of said pair of front wheels,
   (c) sensing valve means in operative communication with said hydraulic power system and said second hydraulic power means for actuating the same to effect directional changes in the path of travel of said pair of rear wheels,
   (d) first linkage operatively interconnecting said sensing valve means and said rear wheel assembly to effect directional changes in the path of travel of said pair of rear wheels independently of said second hydraulic power means,
   (e) second linkage selectively operable to interconnect said front wheel assembly and said sensing valve means whereby to actuate said sensing valve means to effect directional changes in the path of travel of the said pair of rear wheels inversely corresponding to directional changes in the path of travel of said pair of front wheels.

2. A steering system according to claim 1, in which the second linkage comprises a control assembly including
   (a) a control member mounted on the tractor for pivotal movement about a horizontal axis and having first and second cam means arranged in predetermined spaced relation with said axis,
   (b) means for selectively actuating said control member to operate said second linkage operatively to connect, and disconnect, said front wheel assembly and said sensing valve means, and associated with said first cam means on said member whereby to enable the pivoting of said member about said horizontal axis in a predetermined path,
   (c) pin and slot means arranged for pivotal movement about said horizontal axis and in predetermined spaced relation with said first and second cam means,
   (d) first sub-linkage operatively connected with said front wheel assembly and said pin and slot means whereby directional changes in said pair of front wheels are reflected in corresponding pivotal movement of said pin and slot means,
   (e) second sub-linkage operatively connected with said sensing valve means and said pin and slot means for longitudinal movement correspondingly upon pivotal movement of said pin and slot means,
   (f) means on said second sub-linkage operatively associated with said second cam means whereby to enable angular adjustment of said second sub-linkage in response to pivotal movement of said control member while permitting longitudinal movement of said second sub-linkage in response to pivotal movement of said pin and slot means.

3. A steering system according to claim 2 in which the first cam means comprises a cam track of predetermined pattern corresponding to relative movement of said pin and slot means and the second cam means comprises a cam track of predetermined pattern corresponding to the path of maximum pivotal movement of said pin means about said horizontal axis.

4. A steering system according to claim 2 in which the first cam means comprises a cam track of predetermined pattern and said means for selectively actuating said control member comprises means engageable with said cam track and conformed and operatively arranged to shift said control member to, and maintain said control member in, selected positions of adjustment.

5. A steering system according to claim 2 in which the pin and slot means comprise an arm mounted adjacent one end thereof on the tractor co-axially with said control member for pivotal movement in a plane generally parallel therewith, said arm having a slot extending generally longitudinally thereof and being connected adjacent its other end in relatively pivotal relation with said first sub-linkage, said slot being arranged to receive in generally vertical sliding relation a pin carried by said second sub-linkage, the parts being so conformed and operatively arranged whereby movement of said first sub-linkage longitudinally thereof will be transmitted to said second sub-linkage according to the pivotal radius of said pin.

6. A steering system according to claim 1 in which the second linkage comprises a control assembly including a control member selectively operable to prevent directional changes in the path of travel of said pair of rear wheels.

7. A steering system according to claim 6 in which the control assembly includes means operatively associated with the control member for securing the latter in selected positions of adjustment.

8. A steering system for a tractor equipped with a hydraulic power system and having front and rear wheel assemblies respectively including a pair of front wheels and a pair of rear wheels, said pairs of wheels being separately steerable in relation to the longitudinal axis of the tractor, (a) first and second hydraulic power means in operative communication with said hydraulic power system and arranged respectively to actuate said pairs of wheels in steering movement thereof, (b) valve means in operative communication with said hydraulic power system and said first hydraulic power means for actuating the same under operator control, to effect directional changes in the path of travel of said pair of front wheels, (c) sensing valve means including a valve spool extension operatively connected with said rear wheel assembly to effect directional changes in the path of travel of said pair of rear wheels, (d) a control assembly selectively operable to enable and to prevent directional changes in the path of travel of the pair of rear wheels in response to such changes in the path of travel of the pair of front wheels, (e) first linkage in operative association with said valve spool and said control assembly, (f) second linkage in operative association with said front wheel assembly and said control assembly, (g) said control assembly comprising
  (1) a control member mounted on the tractor for pivotal movement about a horizontal axis and having first and second cam tracks arranged in predetermined spaced relation with said axis,
  (2) means in operative association with said first cam track for selectively actuating said control member to, and maintaining the same in, positions of adjustment,
  (3) pin and slot mechanism supported on the tractor for pivotal movement co-axially and in generally parallel spaced relation with said control member, said pin and slot mechanism being operatively associated with said first and second linkages,
  (4) means on said first linkage in operative association with said second cam track, (h) the parts being so conformed and arranged to operate under operator control whereby in one position of adjustment of said control member, to prevent directional changes in the path of travel of said pair of rear wheels, and in another position of said control member to enable such changes inversely in response to directional changes in the path of travel of the said pair of front wheels.

9. A steering system according to claim 8 in which the sensing valve means are in operative communication with the hydraulic power system and the second hydraulic power means for actuating the same to supplement effecting directional changes in the path of travel of the pair of rear wheels.

10. A steering system according to claim 8 in which the control member and the pin and slot mechanism and their associated parts are conformed and arranged to operate whereby, in a selected position of adjustment of said control member, directional changes in the path of travel of the front pair of wheels are communicated to the rear wheel assembly in inverse pattern without operator intervention.

References Cited by the Examiner
UNITED STATES PATENTS

| | | | |
|---|---|---|---|
| 3,075,784 | 1/1963 | Beyerstedt | 280—91 |
| 3,185,245 | 5/1965 | Hoyt | 180—79.2 |
| 3,202,238 | 8/1965 | Strader | 180—79.2 |

MILTON BUCHLER, *Primary Examiner.*

J. H. BRANNEN, *Assistant Examiner.*